United States Patent
Ramos

(10) Patent No.: US 7,603,009 B2
(45) Date of Patent: Oct. 13, 2009

(54) DOUBLE-ENDED DISTRIBUTED TEMPERATURE SENSING SYSTEMS

(75) Inventor: Rogerio T. Ramos, Eastleigh (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/306,309

(22) Filed: Dec. 22, 2005

(65) Prior Publication Data
US 2006/0215971 A1    Sep. 28, 2006

(51) Int. Cl.
G02B 6/26 (2006.01)
G02B 6/00 (2006.01)
G02B 6/44 (2006.01)

(52) U.S. Cl. .................. 385/47; 385/12; 385/100

(58) Field of Classification Search ........... 385/12, 385/42, 47, 100
See application file for complete search history.

(56) References Cited

U.S. PATENT DOCUMENTS

| | | | | |
|---|---|---|---|---|
| 4,468,567 A | * | 8/1984 | Sasano et al. | 250/577 |
| 4,703,175 A | * | 10/1987 | Salour et al. | 356/45 |
| 4,733,933 A | * | 3/1988 | Pikulski | 385/12 |
| 4,816,670 A | * | 3/1989 | Kitamura et al. | 250/227.29 |
| 5,047,627 A | * | 9/1991 | Yim et al. | 250/227.23 |
| 5,582,170 A | * | 12/1996 | Soller | 600/322 |
| 5,939,711 A | * | 8/1999 | Crawford et al. | 250/227.17 |
| 6,239,865 B1 | * | 5/2001 | Paritsky et al. | 356/4.07 |
| 2004/0202424 A1 | * | 10/2004 | Cournoyer et al. | 385/39 |

* cited by examiner

Primary Examiner—Charlie Peng
(74) Attorney, Agent, or Firm—James L. Kurka; Daryl R. Wright; Henry L. Ehrlich

(57) ABSTRACT

The present invention comprises a system for deploying double-ended distributed temperature sensing (DTS) systems which utilizes less space than prior art systems. In one embodiment, the present invention comprises a cable having at least two independent optical fibers or cores, the at least two optical fibers or cores having angled ends coated with a reflective material, the angled ends providing an optical connection between the two optical fibers or cores so that light can be transmitted therebetween. In another embodiment, the present invention comprises two optical fibers that are optically connected by an optical connection mechanism. All embodiments of the present invention may be deployed within a wellbore and within a single-ended tubing or control line, thus providing double-ended DTS system operation in a single-ended line.

9 Claims, 4 Drawing Sheets

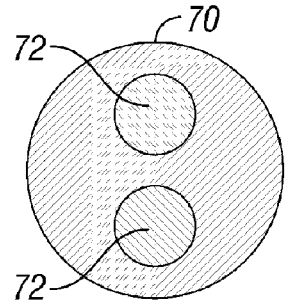
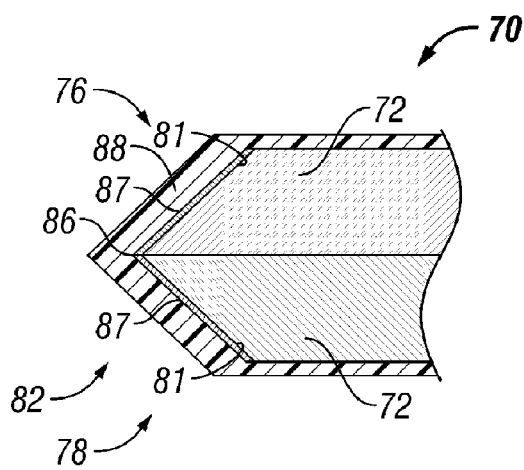
FIG. 7  FIG. 8
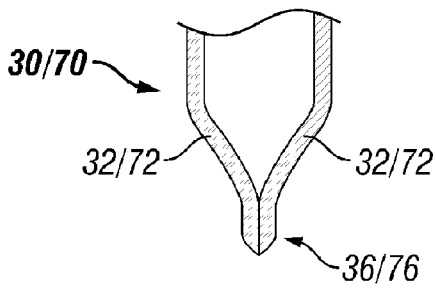
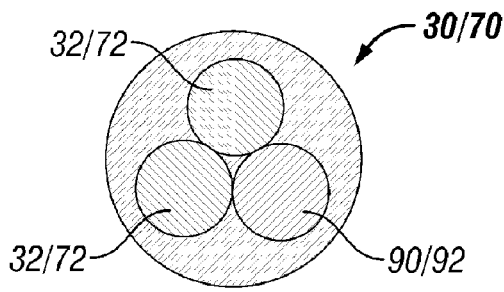
FIG. 9  FIG. 10
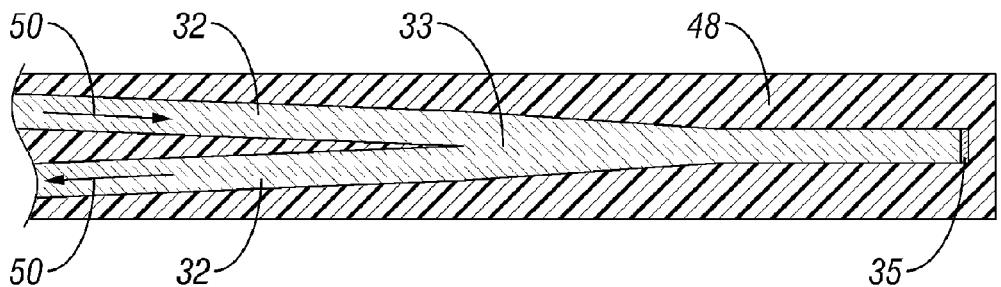
FIG. 11
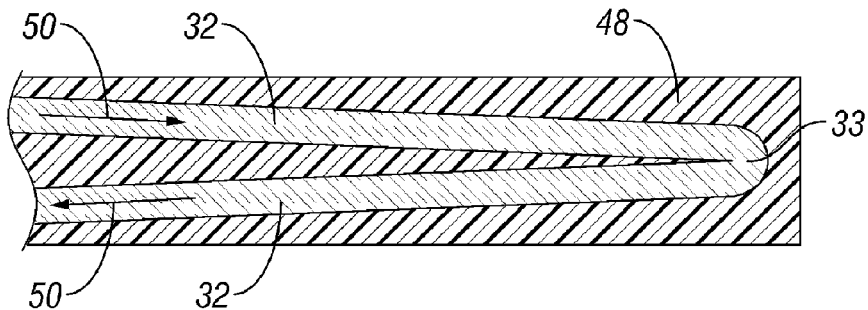
FIG. 12

DOUBLE-ENDED DISTRIBUTED TEMPERATURE SENSING SYSTEMS

This patent application claims priority to a PCT International Application entitled "Double-Ended Distributed Temperature Sensing System", Serial Number PCT/GB2004/002813, filed Jun. 29, 2004, which claims priority to a GB patent application, serial number 0315574.4, filed Jul. 3, 2003.

BACKGROUND OF THE INVENTION

1. Field of the Invention

The invention generally relates to optical fibers that may be used in distributed temperature sensing ("DTS") systems or other distributed sensing systems. More particularly, the invention relates to systems used to deploy such optical fibers in double-ended DTS or other distributed sensing systems and their combination with other sensing systems.

2. Description of Related Art

A system for remote sensing of temperature (and other parameters) that works on the basis of Raman or Brillouin scattering in an optical fiber operated in single-ended mode is known. In one embodiment of a DTS system, an interrogation (probe) laser pulse is launched down the optical fiber, which is deployed along a region of interest, such as a wellbore. The probe pulse is scattered at each point along the fiber length, generating two backscattered Raman signals of new wavelengths, these signals being the anti-Stokes signal and the Stokes signal. The strengths of the signals are temperature-dependent. The two backscattered signals traverse along the length of the multimode fiber to surface electronics where they are detected, and the ratio of their respective signal strength values is calculated in order to provide an estimate of the local temperature at the point of generation of the backscattered signals. However, the accuracy of this system is hindered by the signal propagation loss that occurs when the backscattered signals travel to the surface electronics, this problem being compounded by the loss usually being different for the respective return wavelengths of the backscattered signals. Thus, practically, the ratio of the signal strengths of the backscattered signals provides a measure of the local temperature at a point of interest plus the cumulative difference in the losses at the respective return wavelengths of the signals. This is the case with single-ended DTS applications.

Clearly, this system could be operated with improved accuracy if the differential loss of the backscattered signals were known. The effects of signal loss can be separated from those of temperature by double-ended operation, which entails looping the optical fiber back to the surface electronics and repeating the measurement from the opposite end of the fiber. As temperature changes tend to appear in the same sense when viewed from opposite fiber ends, whilst loss effects appear opposite in sense when viewed from either direction, these two parameters can be distinguished by combining the measurements obtained from the fiber ends.

However, double-ended DTS systems often require more space than single-ended systems. In applications where space is at a premium, such as in wellbores, it would be desirable to devise a way in which double-ended DTS systems could be deployed without requiring as much space as prior art double-ended systems.

Thus, there exists a continuing need for an arrangement and/or technique that addresses one or more of the problems that are stated above.

BRIEF SUMMARY OF THE INVENTION

The present invention comprises systems for deploying double-ended distributed temperature sensing systems or other distributed sensing systems which utilize less space than prior art systems. In one embodiment, the present invention comprises a cable having at least two optical fibers or cores, the at least two optical fibers or cores having angled ends coated with a reflective material, the angled ends providing an optical connection between the two optical fibers or cores so that light can be transmitted therebetween. In another embodiment, the present invention comprises two optical fibers that are optically connected by an optical connection mechanism. All embodiments of the present invention may be deployed within a wellbore and within a single-ended tubing or control line, thus providing double-ended operation in a single-ended tubing or control line.

Advantages and other features of the invention will become apparent from the following description, drawings, and claims.

BRIEF DESCRIPTION OF THE DRAWINGS

FIGS. 7-8 are schematics of another embodiment of the present invention, in which two optical cores are deployed within the same optical fiber.

FIGS. 9 and 10 are schematics of alternative embodiments of the present invention.

FIGS. 11 and 12 illustrate two further embodiments of the present invention.

DETAILED DESCRIPTION OF THE INVENTION

Figure 1:
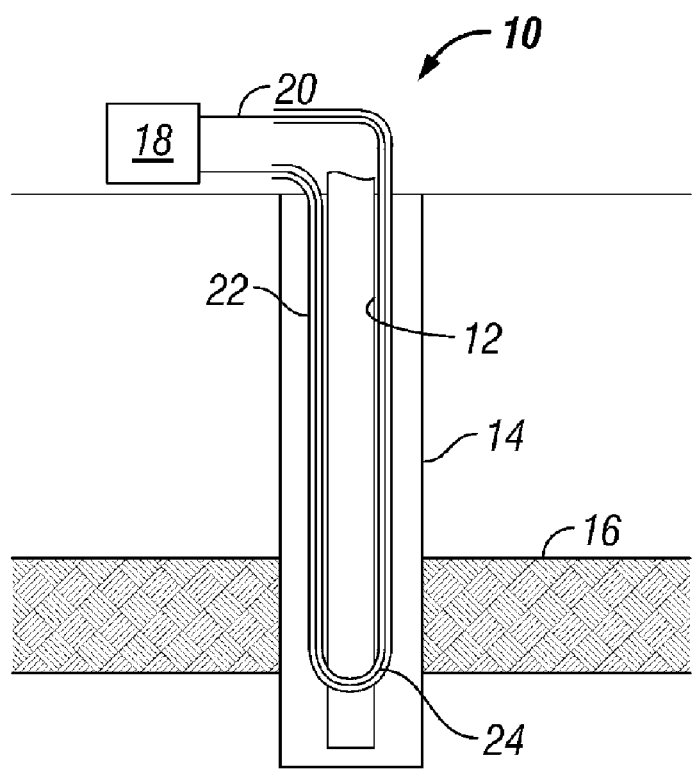
FIG. 1 is a schematic of a prior art double-ended DTS system.

FIG. 1 shows a prior art double-ended DTS system 10 used in wellbores. In this system 10, a tubing 12 is deployed in a wellbore 14 that may intersect an earth formation 16. The DTS system 10 comprises an opto-electronic unit 18, often located at the earth's surface, and an optical fiber 20 that is deployed along a region of interest (for instance across the formation 16). Optical fiber 20 may be deployed within a control line 22 that may be attached to the tubing 12. In operation and as previously disclosed, optical signals are launched by the unit 18 into the optical fiber 20, and reflected optical signals travel back along the optical fiber 20 to the unit 18. The reflected signals are analyzed by the unit 18 to derive a temperature profile along the length of the optical fiber 20. As previously disclosed, in some circumstances it is advantageous to deploy the optical fiber 20 (and thus the control line 22, if used) in a double-ended or U-shaped configuration in order to achieve better accuracy and resolution in the temperature profile measurement. The prior art double-ended configuration utilizes a turn-around sub 24, a component that requires a substantial amount of space. The turn-around sub 24 allows the optical fiber 20 to be looped back to the surface.

FIGS. 2-12 show embodiments of the present invention in which the double-ended configuration is used without a turn-around sub 24, thereby enabling the more accurate and higher resolution double-ended measurement to be made without the need for a substantial amount of space.

Figure 2:
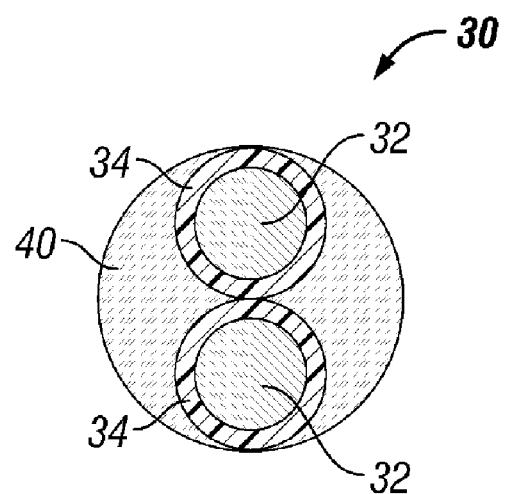
FIGS. 2-4A are schematics of embodiments of the present invention, in which two optical fibers are deployed within the same cable.
Figure 3:
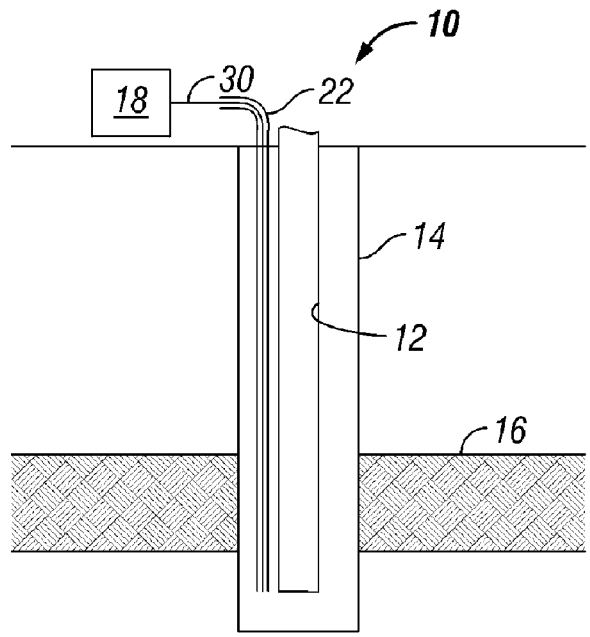

FIG. 2 shows cross-section of a cable 30 that comprises two optical fibers 32 that can be deployed as a single fiber into a wellbore. The cable 30 is designed so that optical signals can be transmitted along, and return optical signals can be provided through, either fiber 32 without the use of a turn-around sub 24. Each optical fiber 32 may include a protective buffer 34, which can be acrylate, polyimide, carbon, or carbon overcoated with polyimide, for example. Cable 30 may also include filler material 40. Filler material 40 can comprise low melting glass or a polymer, for example. In this embodiment, the cable 30 can be deployed within a single control line or tubing 22 (that does not have be U-shaped) as if it was one optical fiber, as shown in FIG. 3.

Figure 4:
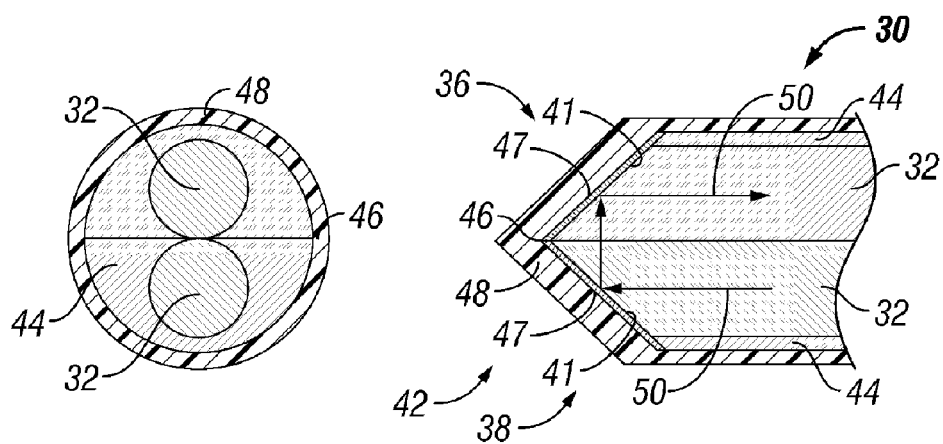

As shown in FIG. 4, in at least one location along the cable 30, and preferably at its bottom end 36, the cable 30 includes an optical connection mechanism 38 which provides an optical connection between the two fibers 32. In the preferred embodiment, the optical connection mechanism 38 comprises a mirror system 42 which directs light between the two fibers 32.

For example, the mirror system 42 may comprise the ends 41 of each fiber 32. In this embodiment, each of the ends 41 may first be stripped of any buffer coating. Each of the fibers 32 is then encapsulated with a material 44 with an index of refraction close to the index of refraction of the fibers 32. Each end 41 is also polished in one plane, for instance at an angle of 45 degrees in relation to the axis of the cable 30. In other embodiments, the angled ends 41 of the fibers 32 may be shaped in other ways, including non-flat surfaces. This angled polish forms a ridge 46 that is tangent to both fibers 32. A reflective layer 47 covers each of the polished ends 41 to form the mirror system 42. The reflective layer 47 can comprise metal material or dielectric systems. In one embodiment, the ends 41 are also coated with a protective layer 48, which protective layer 48 may be made of a composite material, metal, or glass and brings the outside diameter of the ends 41 to the same dimension to the rest of the cable 30. The optical connection mechanism 38, for instance the mirror system 42, enables optical communication between the fibers 32 along the path 50 as shown in FIG. 4. Optical signals can of course also pass in the opposite direction as that shown in path 50. This dual path therefore allows the operation of a double-ended DTS system or other sensing system. And, since the cable 30 can be deployed as a single fiber without the use of a turn-around sub, and even in a single-ended control line or tubing 22 (see FIG. 3), the cable 30 enables the use and operation of a double-ended DTS system, as previously disclosed, while using much less space than prior art double-ended systems.

Figure 4A:
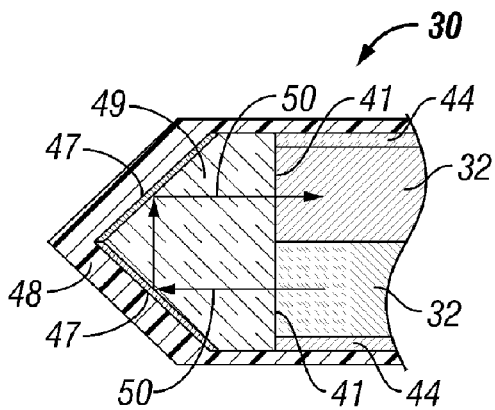

FIG. 4A illustrates an alternative embodiment of the cable 30 of FIG. 4 in which, rather than polishing each of the ends 41 of the fibers 32 at an angle, the ends 41 are left blunt and are optically joined by a pre-fabricated prism 49. The prism 49 may also be coated with a reflective layer 47 and surrounded by a protective layer 48.

FIG. 7 is a cross-section of an embodiment of the present invention that is similar to that shown in FIGS. 2 and 4. However, in this embodiment, instead of having two optical fibers 32 in a cable 30, a single optical fiber 70 is used having at least two cores 72. As shown in FIG. 8, in at least one location along the optical fiber 70, and preferably at its bottom end 76, the optical fiber 70 includes an optical connection mechanism 78 which provides an optical connection between the two cores 72. In the preferred embodiment, the optical connection mechanism 78 comprises a mirror system 82 which directs light between the two cores 72. For example, the mirror system 82 may comprise the ends 81 of each core 72. In this embodiment, each of the ends 81 may first be stripped of any buffer coating. Each end 81 is also polished in one plane, for instance at an angle of 45 degrees in relation to the axis of the optical fiber 70. In other embodiments, the polished, angled ends 81 of the cores 72 may be shaped in other ways, including non-flat surfaces. This angled polish forms a ridge 86 that is tangent to both cores 72. A reflective layer 87 covers each of the polished, angled ends 81 to form the mirrors. The layer 87 can comprise metal material or dielectric systems. In one embodiment, the ends 81 are also coated with a protective layer 88, which protective layer 88 may be made of a composite material, metal, or glass, and brings the outside diameter of the ends 81 to the same dimension as the rest of the optical fiber 70. The optical connection mechanism 78, for instance the mirror system 82, enables optical communication between the cores 72, as previously described in relation to the path between the fibers 32 of FIG. 4.

FIG. 9 shows an alternative embodiment of the cable 30 of FIGS. 2 and 4, and the optical fiber 70 of FIGS. 7 and 8. In this alternative embodiment, the optical fibers 32 of cable 30 or the cores 72 of optical fiber 70 are not mechanically joined together until proximate the bottom end 36 of cable 30 or the bottom end 76 of optical fiber 70.

FIG. 10 shows a cross-section of another alternative embodiment of the cable 30 of FIGS. 2 and 4, and the optical fiber 70 of FIGS. 7 and 8. In this alternative embodiment, at least one additional optical fiber 90 or optical core 92 is included in the cable 30 or optical fiber 70. This additional optical fiber 90 or optical core 92 enables the propagation of an independent optical signal that provides information relating to at least one other parameter of interest. For instance, optical fibers 32 or optical cores 72 are used to provide the temperature profile, as previously disclosed. The additional optical fiber 90 or optical core 92 can then be used to transmit an optical signal to extract information relating to another parameter of interest, such as, for example, pressure, distributed pressure, or flow. The additional optical fiber 90 or optical core 92 can be used as the sensor itself, can include an intrinsic sensor therein (such as a Bragg grating), or can be functionally connected to an extrinsic sensor. It will be recognized as well that the optical fibers 32 or optical cores 72 can provide a distributed measurement of a parameter other than temperature, such as pressure or strain, for example.

Figure 5:
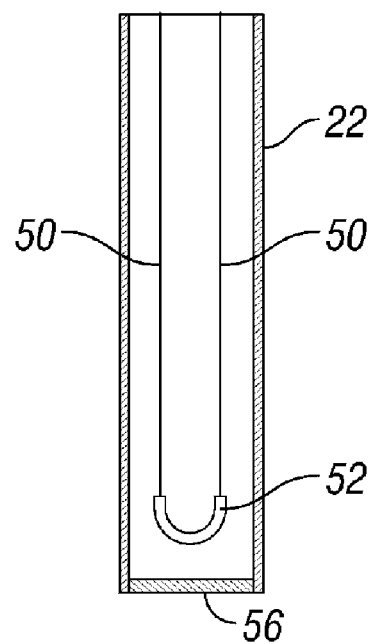
FIGS. 5-6 are schematics of another embodiment of the present invention, in which an optical communication mechanism is used to optically connect two optical fibers.

FIG. 5 shows another embodiment of the present invention. In this embodiment, two optical fibers 50 are connected to each other by an optical connection mechanism 52. Optical connection mechanism 52 provides an optical connection between the two optical fibers 50 to enable double-ended DTS operation. Optical connection mechanism 52 may comprise, for example, a Minibend 180 manufactured by AFL Telecommunications of Franklin, Tenn., USA. In another embodiment, the optical connection mechanism 52 comprises a section of optical fiber with high numerical aperture that allows the guidance of light down very tight bends. The optical connection mechanism 52 should be relatively small. For instance, the optical connection mechanism 52 should be small enough to fit within a standard single-ended control line 22 that can be ¼, 3/16, or ⅛ inches (6.4 mm, 4.8 mm, or 3.2 mm) in diameter.

Figure 6:
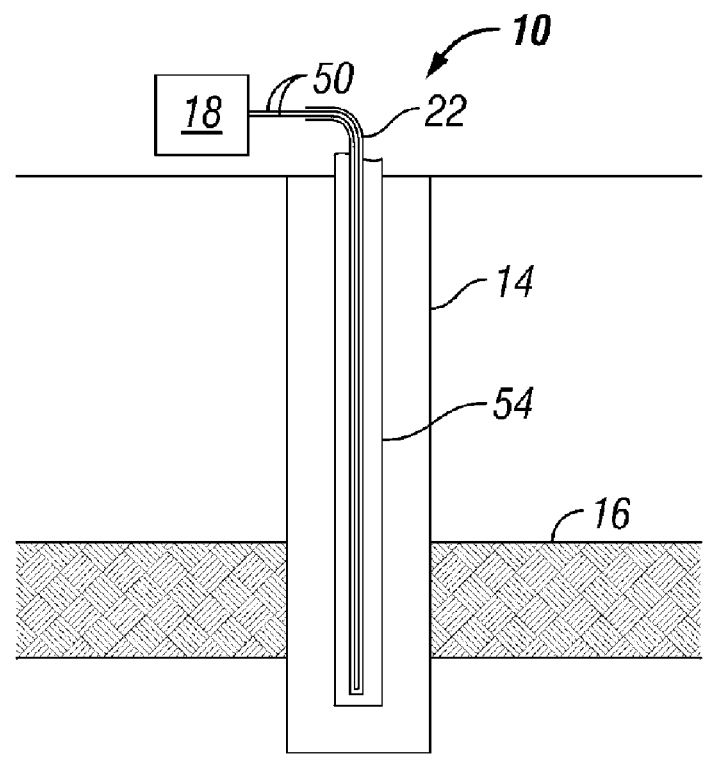

The single-ended control line 22 can be deployed in a wellbore 14 attached to production tubing or to a coiled tubing 54, as shown in FIG. 6. In the embodiment shown in FIG. 6, control line 22 is deployed in the interior of coiled tubing 54 thereby allowing the deployment of the coiled tubing 54 (with control line 22 therein) through well injectors. The deployment of the control line 22 in the interior of coiled tubing 54 (or any other tubing interior) also enables the operation of double-ended DTS systems in so called slimhole systems, for instance coiled tubing having a diameter of 1.5 to 2 inches (38 to 51 mm).

The optical fibers 50 in one embodiment can be deployed into control line 22 at the surface and prior to deploying the control line 22 into the wellbore 14. In this embodiment, the optical fibers 50 are deployed in the open-ended control line 22 and the control line 22 is then plugged at one end by way of plug 56 (see FIG. 5).

In one embodiment, the optical fibers 50 of FIG. 5 and the cable 30 of FIGS. 2 and 4 are deployed within the relevant control line 22 by way of hydraulic force wherein fluid drag causes the fibers 50 or cable 30 to move within the interior of the control line 22. This deployment technique is described in U.S. Pat. RE 37,283 E.

FIGS. 11 and 12 are cross-sections of additional embodiments of the present invention in which the distal end of the optical fibers 32 are joined by fusion. The two fibers 32 must first be free of any buffer coating. The fibers 32 are then fused together and the fused end is cut and polished, cut, polished and coated with a mirror, coated with a mirror and protected, or merely protected.

In the embodiment of FIG. 11, the optical fibers 32 are fused at 33 and pulled in the well-known manner used to make fused optical couplers. The assembly is then cleaved and coated at its end to produce a mirror 35. The mirror 35 may be made of metal or a dielectric material.

In the embodiment of FIG. 12, the ends of the optical fibers 32 are fused at 33 and coated. Although this embodiment may have less optical coupling efficiency than the embodiment of FIG. 11, it is somewhat easier to manufacture. Finally, the embodiments FIGS. 11 and 12 may be covered with a protective layer 48 to bring the outer diameter to the necessary size.

The term "single-ended control line" as used herein shall include each of the legs of a U-shaped control line (as shown in FIG. 1), provided that the optical fiber or cable is not extended through the turn-around sub 24. In other words, there is hydraulic but not optical communication between the two legs of the U-shaped control line. The embodiments of this invention would be disposed within one or both of the legs of the U-shaped control line. It should be noted that the optical waveguide arrangement of the present invention may also be deployed in other types of tubing, such as flexible tubing, or directly within coiled tubing, for example.

Although the embodiments of this invention have been described within the context of a DTS system used in a wellbore, the embodiments of the present invention may also be used in other applications that require double-ended transmission of information within a restricted space. For instance, double-ended transmission may be required for sensing applications relating to flow, pressure, or other parameter sensing. Moreover, the embodiments of the present invention may be deployed in remote locations other than a wellbore, such as in tunnels, along power lines, or along industrial process lines or vessels.

While the invention has been disclosed with respect to a limited number of embodiments, those skilled in the art, having the benefit of this disclosure, will appreciate numerous modifications and variations thereof. It is intended that the appended claims cover all such modifications and variations as fall within their scope.

What is claimed is:

1. A cable used to transmit optical signals in a remote location, comprising two optical waveguides each having an angled end coated with a reflective material, the angled ends providing an optical connection between the two optical waveguides so that light can be transmitted therebetween, wherein the two optical waveguides are not mechanically joined together except proximate to the optical connection at the angled ends and the cable is deployed in a single-ended control line.

2. The cable of claim 1, wherein the angled ends are encapsulated with a material having an index of refraction substantially the same as the index of refraction of the waveguides.

3. The cable of claim 1, wherein the single-ended control line has a diameter equal to or less than 6.4 mm.

4. The cable of claim 1, wherein the remote location comprises a wellbore.

5. The cable of claim 1, wherein the two optical waveguides are part of a distributed sensing system.

6. The cable of claim 5, wherein the distributed sensing system is a distributed temperature sensing system adapted to measure the temperature profile along the two optical waveguides.

7. A parameter sensing system for use in a wellbore, the system comprising:
    a sensing cable having a bottom end positioned within the wellbore, the cable including a first and a second optic fiber each having ends, the ends optically connected to one another proximate to the bottom end of the cable by an optical connection mechanism, the pair of optic fibers forming a double-ended optic fiber for obtaining a temperature profile within the wellbore, wherein the first optic fiber and the second optic fiber are not mechanically joined together until proximate the bottom end; and
    an optical control unit functionally connected to the sensing cable and the sensing cable is deployed in a single-ended control line.

8. The system of claim 7, further including a single-ended tubing deploying the sensing cable in the wellbore.

9. The system of claim 7, wherein the single-ended control line has a diameter equal to or less than 6.4 mm.

* * * * *